(12) United States Patent
Nichols

(10) Patent No.: US 12,021,362 B2
(45) Date of Patent: Jun. 25, 2024

(54) EDGE ADAPTER FOR ELECTRICAL BOX EXTENSION RINGS

(71) Applicant: Robert G Nichols, Davie, FL (US)

(72) Inventor: Robert G Nichols, Davie, FL (US)

( * ) Notice: Subject to any disclaimer, the term of this patent is extended or adjusted under 35 U.S.C. 154(b) by 0 days.

(21) Appl. No.: 18/224,957

(22) Filed: Jul. 21, 2023

(65) Prior Publication Data
US 2023/0361547 A1 Nov. 9, 2023

Related U.S. Application Data

(63) Continuation of application No. PCT/US2021/050233, filed on Sep. 14, 2021, which is a continuation of application No. 17/381,886, filed on Jul. 21, 2021, now Pat. No. 11,715,942.

(51) Int. Cl.
*H02G 3/12* (2006.01)

(52) U.S. Cl.
CPC ..................... *H02G 3/12* (2013.01)

(58) Field of Classification Search
CPC ............ H02G 3/08; H02G 3/081; H02G 3/12; H02G 3/10; H02G 3/086; H05K 5/00; H05K 5/02
USPC ............... 174/50, 559, 53, 57, 58, 17 R, 61; 220/3.2–3.9, 4.02; 248/906
See application file for complete search history.

(56) References Cited

U.S. PATENT DOCUMENTS

| | | | | |
|---|---|---|---|---|
| 2,506,207 A * | 5/1950 | Geist | ......................... | H02G 3/14 220/3.4 |
| 3,917,101 A * | 11/1975 | Ware | ...................... | H02G 3/123 174/58 |
| 5,932,844 A * | 8/1999 | MacAller | ............... | H02G 3/081 174/652 |
| 7,235,739 B2 * | 6/2007 | King, Jr. | ................ | H02G 3/086 174/53 |

(Continued)

*Primary Examiner* — Angel R Estrada
(74) *Attorney, Agent, or Firm* — The Concept Law Group, PA; Scott D. Smiley; Scott M. Garrett

(57) ABSTRACT

An edge adapter for electrical box extension rings includes a flexible adapter body enclosing and defines an adapter channel, the flexible adapter body has a continuous sidewall defining at least four sides, each side having an inner wall surface facing the adapter channel and an outer wall surface opposite to the inner wall surface. A first pair of retention flanges are adjacent one another and disposed on and radially projecting from the outer wall surface on a first side of the adapter body. A second pair of retention flanges are adjacent one another and disposed on and radially projecting from the outer wall surface on the first side of the adapter body, the first pair of retention flanges and the second pair of retention flanges together defining a first retention slot shaped and dimensioned to receive a first inner wall of an electrical box extension ring. A third pair of retention flanges are adjacent one another and disposed on and radially projecting from the outer wall surface on the second side of the adapter body opposite the first side. A fourth pair of retention flanges are adjacent one another and disposed on and radially projecting from the outer wall surface on the (Continued)

second side of the adapter body, the third pair of retention flanges and the fourth pair of retention flanges together defining a second retention slot shaped and dimensioned to receive a second inner wall of the electrical box extension ring.

20 Claims, 16 Drawing Sheets

(56) References Cited

U.S. PATENT DOCUMENTS

| | | | | |
|---|---|---|---|---|
| 7,462,775 | B1* | 12/2008 | Gretz | H02G 3/16 |
| | | | | 174/64 |
| 7,531,743 | B2* | 5/2009 | Johnson | H02G 3/081 |
| | | | | 174/53 |
| 8,575,484 | B1* | 11/2013 | Witherbee | H02G 3/126 |
| | | | | 174/58 |
| 8,748,744 | B2* | 6/2014 | O'Connor | H02G 3/08 |
| | | | | 174/53 |
| 10,263,403 | B2* | 4/2019 | Korcz | H02G 3/126 |
| 11,557,888 | B2* | 1/2023 | Phillips | H01R 13/746 |
| 11,715,942 | B2* | 8/2023 | Nichols | H02G 3/081 |
| | | | | 174/480 |
| 2009/0057303 | A1* | 3/2009 | Oddsen | H02G 3/126 |
| | | | | 220/3.5 |

* cited by examiner

EDGE ADAPTER FOR ELECTRICAL BOX EXTENSION RINGS

CROSS-REFERENCE TO RELATED APPLICATION

This application is a continuation of, and claims priority to PCT/US2021/50233 filed Sep. 14, 2021, and to its priority application, U.S. patent application Ser. No. 17/381,886, filed Jul. 21, 2021, the entirety of which is incorporated by reference.

FIELD OF THE INVENTION

The present invention relates generally to electrical box extension rings, and, more particularly, relates to adapters configured to couple with and/or cover an edge of an extension ring for electrical boxes.

BACKGROUND OF THE INVENTION

Electrical boxes widely used for circuit wire splicing often require the use of an extension ring or box extender to expand the maximum fill capacity of the box. Most electrical codes require that all electrical boxes (which hold the electrical wiring associated with outlets, switches, light fixtures, and more) must be installed such that the front face is flush with the wall surface. This is done to ensure that the electrical box is sealed and the wiring inside is properly protected from external elements, forces, and manipulation. However, particularly in the case of renovations or remodels wherein, for example, new paneling or backsplash is installed over an existing wall surface, the electrical box may be improperly installed such that the front edge of the electrical box is recessed back into the wall and is not flush with the wall surface as it should be. In such cases, those of ordinary skill in the art generally affix or attach an extension ring, also commonly referred to as a box extender, to the front edge of the electrical box to make the electrical box flush with the wall surface. Box extenders generally consist of metal or plastic rings available in varying sizes and depths to fit snugly around or just inside an existing electrical box. When installed over an existing electrical box, they extend the box so it is flush with the front face of the wall, thereby creating a code-approved enclosure for the wire connections inside. Box extenders are designed and operably configured to add cubic capacity to an electrical box so as to bring the same into compliance with any applicable electrical code restrictions, rules, and regulations.

The principal limitations associated with existing box extenders are the significant health and safety risks posed by the exposed sharp inner edge of existing box extenders and, more specifically, of existing metal box extenders, as well as the damage and degradation caused to the electrical wiring within the electrical box by said sharp inner edge(s). Specifically, metal extension rings have an exposed sharp inner wall edge which, over time, cuts into circuit wires causing electrical circuit faults and related electrical issues. The natural building vibration characteristic of all buildings that is caused by various forces including, without limitation, roof-top air conditioning units, air handler units, chiller towers, outside air and exhaust fans, etc., cause the sharp inner edge of the box extender to move in an oscillating manner that ultimately cuts into the circuit wires. Resulting circuit faults can have disastrous and dangerous consequences to both people and property. High voltage (120 VAC and higher) circuit faults can and have caused fires, circuit breaker trips, electrical shock hazards, etc. Taking fire alarm systems as an example, fire alarm systems circuit wire (low voltage) utilize the same electrical boxes and extension rings. The same faults occur when the circuit wires come in contact with the sharp edges including but not limited to ground faults, short circuits, nuisance alarms, and fire alarm system failures. In addition to the foregoing, the exposed sharp inner edge of existing box extenders also poses the obvious risk of cutting the finger or hand of electricians and other individuals who may come into direct contact with the edge when adjusting, repairing, replacing, or otherwise manipulating the wiring within the electrical box.

Therefore, a need exists to overcome the problems with the prior art as discussed above.

SUMMARY OF THE INVENTION

The invention provides an edge adapter for electrical box extension rings that overcomes the hereinafore-mentioned disadvantages of the heretofore-known devices and methods of this general type and that provides an insulation around the sharp edge of the extension ring to protect the circuit wires within and the individuals who come into close or direct contact with the electrical box and extension ring. The present invention also allows the extension ring to lock into place to the electrical box extender, thereby preventing it from becoming dislodged during servicing or troubleshooting of the electrical circuits.

With the foregoing and other objects in view, there is provided, in accordance with the invention, an edge adapter for electrical box extension rings that includes a flexible adapter body enclosing and defines an adapter channel, the flexible adapter body has a continuous sidewall defining at least four sides, each side having an inner wall surface facing the adapter channel and free of sharp edges sufficient to cut through wire insulation and an outer wall surface opposite to the inner wall surface. A first pair of retention flanges are adjacent one another and disposed on and radially projecting from the outer wall surface on a first side of the adapter body. A second pair of retention flanges are adjacent one another and disposed on and radially projecting from the outer wall surface on the first side of the adapter body, the first pair of retention flanges and the second pair of retention flanges together defining a first retention slot shaped and dimensioned to receive a first inner wall of an electrical box extension ring. A third pair of retention flanges are adjacent one another and disposed on and radially projecting from the outer wall surface on the second side of the adapter body opposite the first side. A fourth pair of retention flanges are adjacent one another and disposed on and radially projecting from the outer wall surface on the second side of the adapter body, the third pair of retention flanges and the fourth pair of retention flanges together defining a second retention slot shaped and dimensioned to receive a second inner wall of the electrical box extension ring.

In accordance with a further feature of the present invention, a fifth pair of retention flanges are adjacent one another and disposed on and radially projecting from the outer wall surface on a third side of the adapter body and a sixth pair of retention flanges are adjacent one another and disposed on and radially projecting from the outer wall surface on the third side of the adapter body, the fifth pair of retention flanges and the sixth pair of retention flanges together defining a third retention slot shaped and dimensioned to receive a third inner wall of an electrical box extension ring.

In accordance with another feature of one embodiment of the present invention, the fifth and sixth pair of retention flanges are interposed along the sidewall between the first and second pair of retention flanges on the one hand and the third and fourth pair of retention flanges on the other hand.

In accordance with a further feature of the present invention, a sidewall thickness separating the outer wall surface from the inner wall surface is between 2 mm and 12 mm.

In accordance with yet another feature of the present invention, the sidewall thickness is uniform throughout the sidewall.

In still another embodiment of the present invention, a sidewall thickness separating the outer wall surface from the inner wall surface is less than approximately 5 mm.

In one more embodiment of the present invention, the flexible adapter body is of a flame-retardant material.

In accordance with another feature, a distance between the first pair of retention flanges and the second pair of retention flanges is approximately 12 mm.

In accordance with a further feature of the present invention, the flexible adapter body defines a median axis spanning through a geometric center of the adapter body, the first pair of retention flanges and the second pair of retention flanges symmetrically disposed on opposite sides of the median axis.

In accordance with another feature, a distance between the first side of the adapter body and the second side of the adapter body is less than a distance between the first inner wall and the second inner wall of the electrical box extension ring and a distance between a distal terminal end of the first pair of retention flanges and a distal terminal end of the third pair of retention flanges is greater than the distance between the first inner wall and the second inner wall of the electrical box extension ring.

In accordance with a further feature of the present invention, the first pair of retention flanges and the second pair of retention flanges each further include a distal terminal end offset an offset length, measured from the outer wall surface to the distal terminal end, that is less than approximately 12 mm.

In accordance with yet another embodiment of the present invention, an electrical box extender assembly includes an electrical box extension ring with a sidewall and an inner wall perpendicular to the sidewall and radially extending inwardly therefrom. An edge adapter for electrical box extension rings has a flexible adapter body enclosing and defining an adapter channel, the flexible adapter body having a continuous sidewall defining at least four sides, each side having an inner wall surface facing the adapter channel and an outer wall surface opposite to the inner wall surface; a first pair of retention flanges adjacent one another and disposed on and radially projecting from the outer wall surface on a first side of the adapter body; a second pair of retention flanges adjacent one another and disposed on and radially projecting from the outer wall surface on the first side of the adapter body, the first pair of retention flanges and the second pair of retention flanges together defining a first retention slot shaped and dimensioned to receive a first portion of the inner wall of the electrical box extension ring; a third pair of retention flanges adjacent one another and disposed on and radially projecting from the outer wall surface on the second side of the adapter body opposite the first side; and a fourth pair of retention flanges adjacent one another and disposed on and radially projecting from the outer wall surface on the second side of the adapter body, the third pair of retention flanges and the fourth pair of retention flanges together defining a second retention slot shaped and dimensioned to receive a second portion of the inner wall of the electrical box extension ring opposite the first portion of the inner wall of the electrical box extension ring.

Although the invention is illustrated and described herein as embodied in an edge adapter for electrical box extension rings, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the edge adapter spanning from a back end surface to a front end surface thereon.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
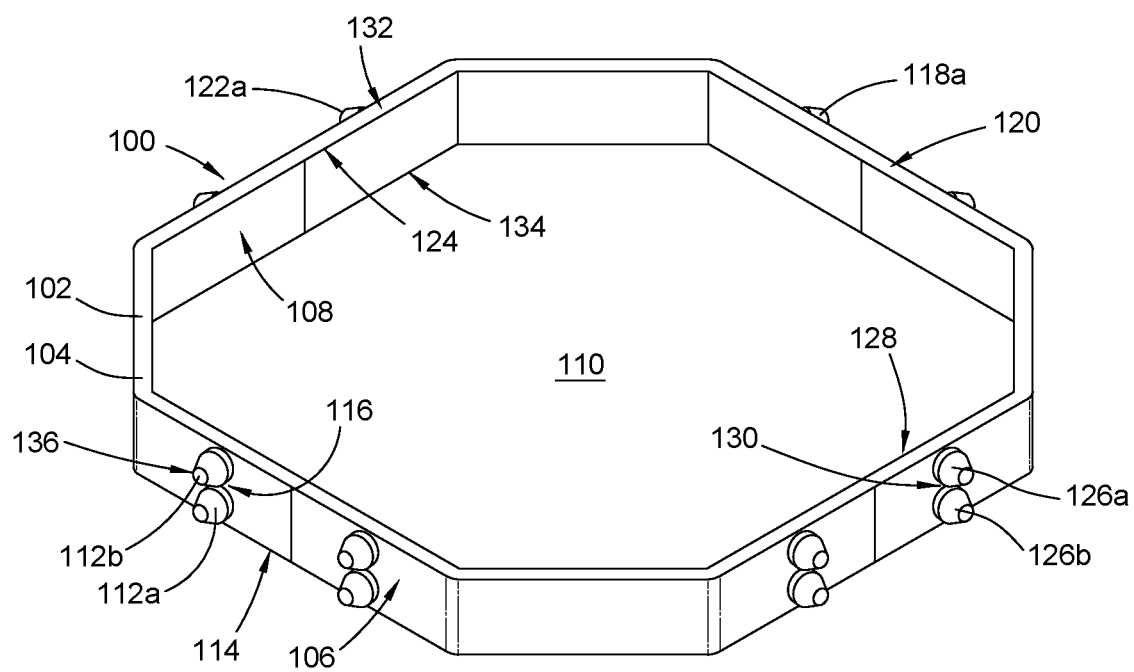
FIG. 1 is a top perspective view of an edge adapter for electrical box extension rings, in accordance with one exemplary embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient edge adapter for electrical box extension rings intended to be used in conjunction with an electrical box extender, also commonly referred to as an electrical box extension ring or extension ring, to overcome the known limitations of existing prior art. Embodiments of the invention provide an insulation around the exposed and sharp inner edge of the extension ring to protect the circuit wires within and the individuals who come into close or direct contact with the electrical box and extension ring, from dangerous damage or injury. In this way, the present invention serves to beneficially decrease the health and safety risks posed by, and associated with, existing electrical box extenders and extension rings. In addition, embodiments of the invention provide a mechanism for the edge adapter to lock into place to the electrical box extender, thereby preventing it from becoming dislodged during servicing or troubleshooting of the electrical circuits. The present invention also provides an edge adapter that is substantially flexible so it may be properly positioned on and around the sharp inner edge of extension rings and selectively removably coupled thereto.

Figure 10:
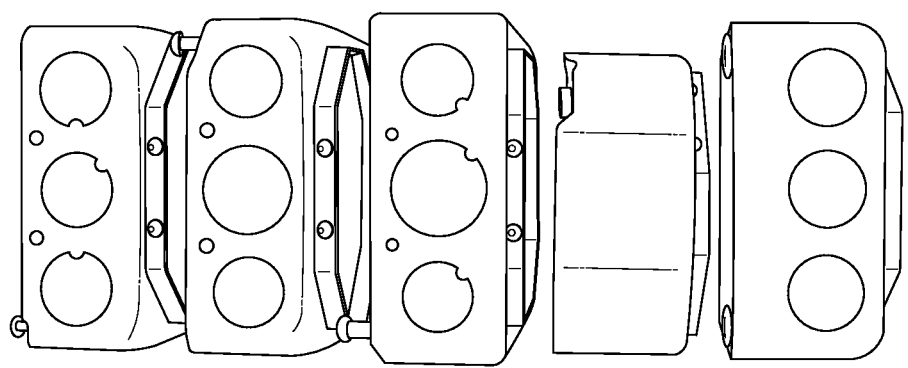
FIG. 10 is an elevational and perspective side views of a plurality of electrical box extension rings with exemplary edge adapter for electrical box extension rings disposed thereon, in accordance with the present invention.

Referring now to FIG. 1, one embodiment of the present invention is shown in a top perspective view. FIG. 1 shows several advantageous features of the present invention, but, as will be described below, the invention can be provided in several shapes, sizes, combinations of features and components, and varying numbers and functions of the components. The first example of an edge adapter for electrical box extension rings 100 (hereinafter, "edge adapter 100"), as shown in FIG. 1, comprises an adapter body 102 of a polymeric material with a front edge 132, with a rear edge 134 opposing the front edge 132, with a sidewall 104 having an outer wall surface 106 and an inner wall surface 108 that is substantially planar separating the front and rear edges 132, 134, and enclosing and defining an adapter channel 110. Exemplary dimensions of the adapter body 102 are between approximately 40 mm and 115 mm in length, between approximately 60 mm and 115 mm in width, and between approximately 5 mm and 12 mm in height (as any higher will likely impede the box fill capacity and will not fit with raceway connectors and create difficulty in installation). Because the adapter body 102 is designed and operably configured to fit on and around the exposed inner edge of an extension ring, the dimensions of the adapter body 102 may vary proportionately in accordance with the dimensions of the extension ring to which the edge adapter 100 is selectively coupled. As best depicted in FIG. 1 and FIGS. 10-16, the general shape, form, or outline of the adapter body 102 may also vary in accordance with the general shape, form, or outline of the extension ring. FIG. 1 depicts an octagonal adapter body 102, but it may beneficially be of another polygonal or circular shape. FIG. 10 depicts several different types of adapter bodies 102 coupled to extension rings.

Figure 3:
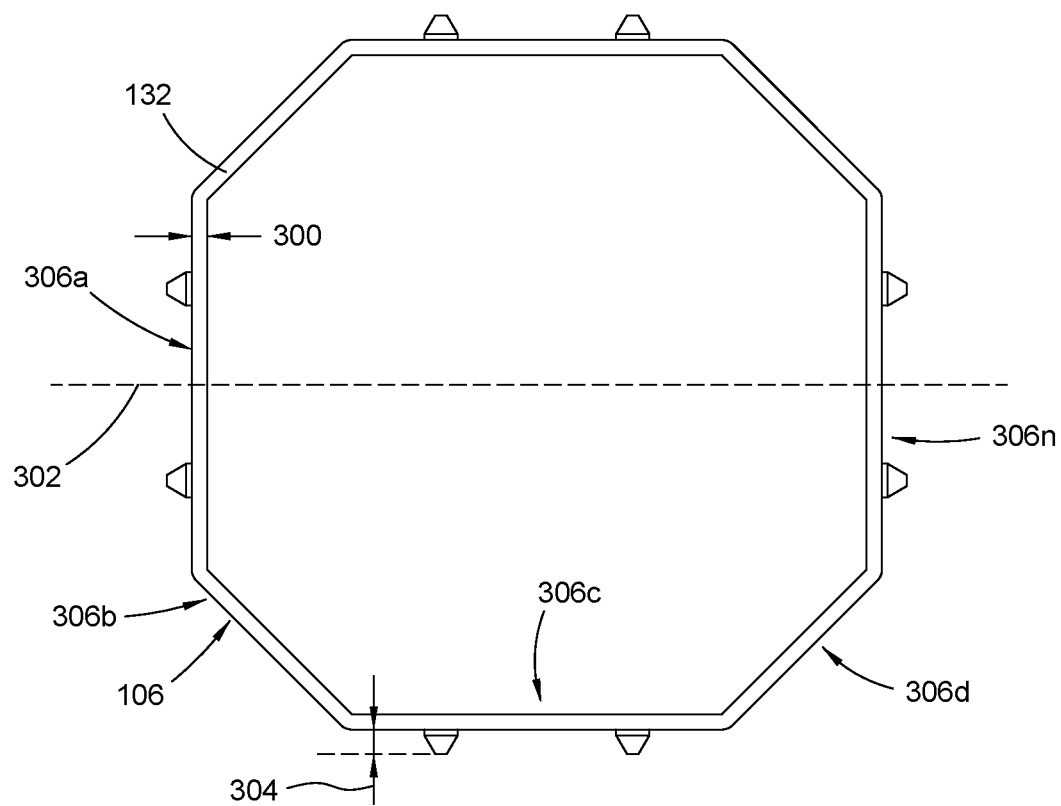
FIG. 3 is a top plan view (which would look the same from a bottom plan view) of the edge adapter for electrical box extension rings of FIG. 1, in accordance with the present invention.
Figure 4:
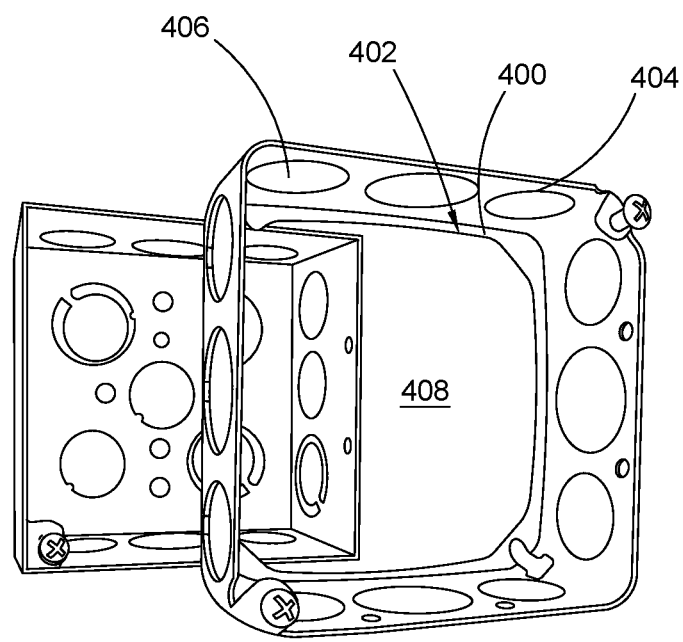
FIG. 4 is a perspective front view of an exemplary electrical box and electrical box extender.
Figure 5:
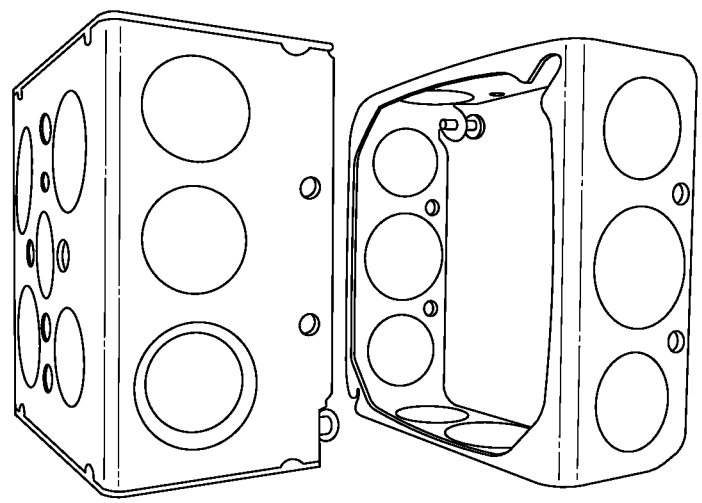
FIG. 5 is a perspective side view of an exemplary electrical box and electrical box extender.
Figure 11:
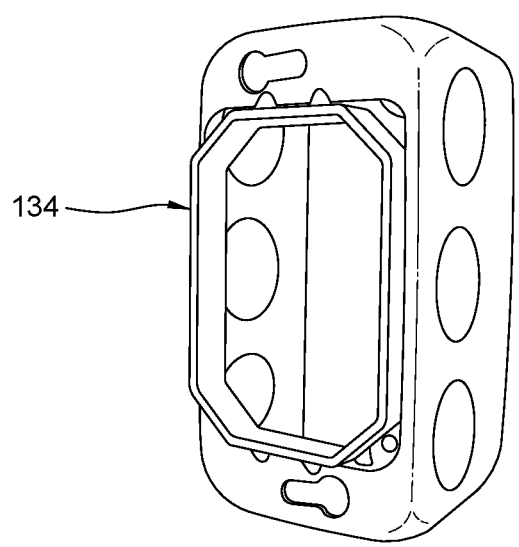
FIG. 11 is a perspective rear view of another exemplary embodiment of an edge adapter for electrical box extension rings disposed on an extension ring, in accordance with the present invention.
Figure 12:
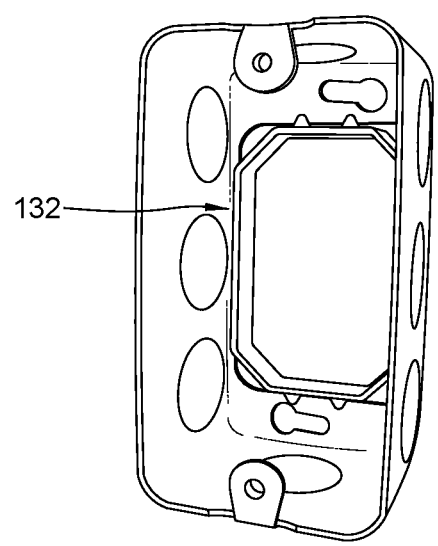
FIG. 12 is a perspective front view of yet another exemplary embodiment of an edge adapter for electrical box extension rings disposed on an extension ring, in accordance with the present invention.
Figure 13:
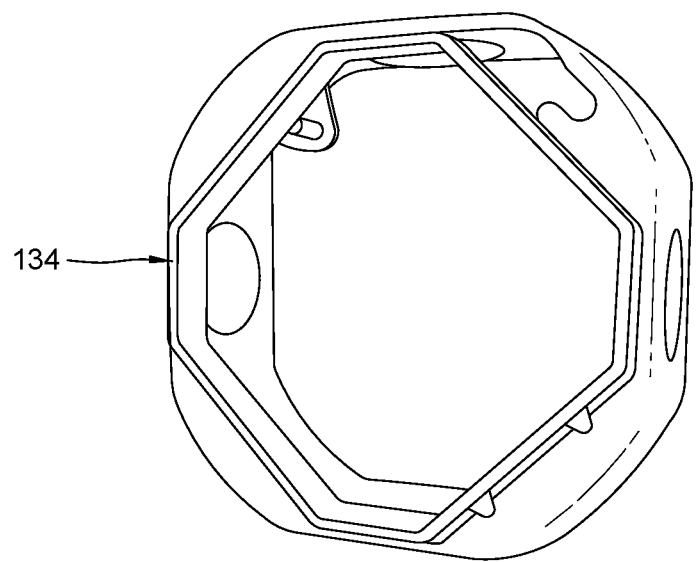
FIG. 13 is a perspective rear view of another exemplary edge adapter for electrical box extension rings disposed on an extension ring, in accordance with the present invention.
Figure 14:
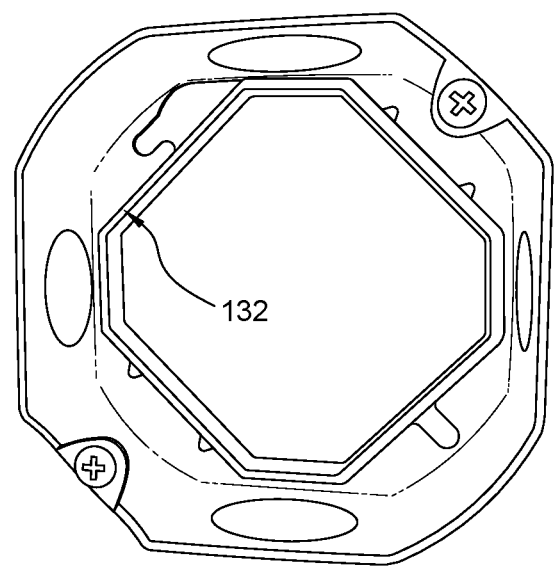
FIG. 14 is a perspective front view of another exemplary edge adapter for electrical box extension rings disposed on an extension ring, in accordance with the present invention.
Figure 15:
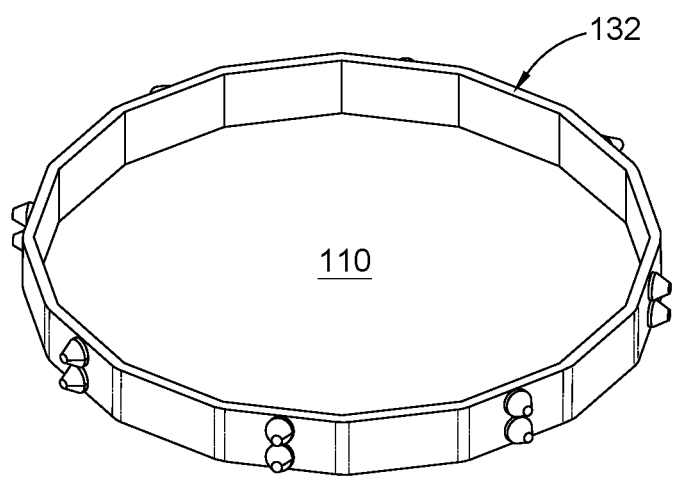
FIG. 15 is a top perspective view of another exemplary embodiment of an edge adapter for electrical box extension rings, in accordance with the present invention.
Figure 16:
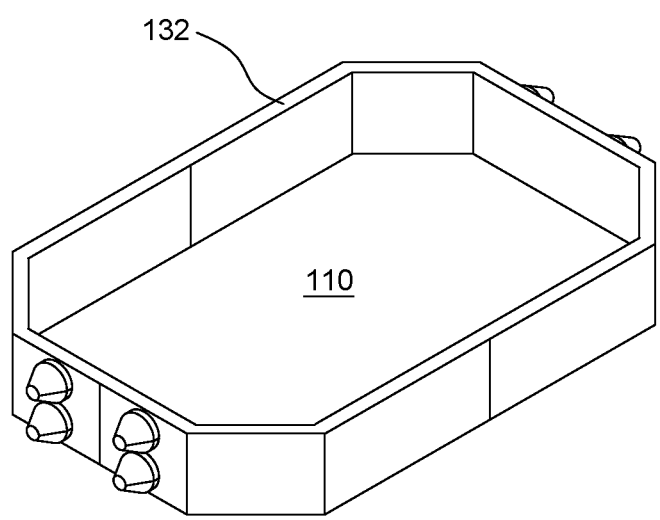
FIG. 16 is a top perspective view of yet another exemplary embodiment of an edge adapter for electrical box extension rings, in accordance with the present invention.

FIGS. 11-12 and FIG. 16 depict an elongated octagon-shaped adapter body 102. FIGS. 13-14 also depict octagon-shaped adapter bodies 102 but the sidewall 104 defines a wider adapter channel 110 than that depicted in FIGS. 11-12 and FIG. 16, wherein the adapter channel 110 in the latter figures is substantially narrower. FIG. 15 depicts a substantially circular sidewall 104. As best depicted in FIG. 3, the sidewall 104 may comprise a plurality of sidewall sections 306a-n, wherein "n" refers to any number greater than one, spanning along the length of the sidewall 104. In a preferred embodiment, each of the sidewall sections 306a-n (or at least more than 50% of the sidewall sections 306a-n) have a plurality of retention flanges 112a-b disposed thereon and that are parallel to the portion of the inner wall 400 that is received within the retention slot 116. In another embodiment, each of the sidewall sections 306a-n form a 135° angle with each sidewall section 306a-n adjacent thereto. The obtuse angle formed by each sidewall section 306 provides for a greater area and volume of the adapter channel 110 and a wider adapter channel 110 to accommodate the electrical circuit wires therein.

It should be understood that terms such as, "front," "rear," "side," "top," "bottom," and the like are indicated from the reference point of a viewer viewing the adapter body 102 from its front edge 132 (see FIG. 3, FIG. 6, FIG. 12, and FIG. 14). As used herein, the term "wall structure" is intended broadly to encompass continuous structures, as well as separate structures that are coupled together so as to form a substantially continuous external surface.

Exemplary embodiments of the adapter body 102 are of a polymeric material, e.g., isoprene, polysiloxane, artificial elastomers, etc., having key properties of flexibility, potential malleability, high tear and tensile strength, resilience, and resistance to abrasion, friction, extreme temperatures, fire, and water swell. The foregoing materials and corresponding properties are significant because the adapter body 102 needs to be physically manipulated and sometimes flexed to fit within the adapter channel 110 on and around the inner edge of the extension ring. As such, the adapter body 102 can be of a material composition that allows for limited flexibility and manipulation to properly position the adapter body 102 on the inner edge of the extension ring. The material composition of the adapter body 102 is also vital because, in one embodiment, it is of a flame-retardant material that is substantially resistant to flame, fire, and electrical sparks emitted from the electrical circuit wires having the potential to ignite a fire. Flame-retardant properties include, without limitation, increasing ignition resistance, reducing the speed of flame spread, reducing heat release, and reducing smoke and fume generation. Exemplary embodiments of the adapter body 102 meet or satisfy the UL 94 plastics flammability standard released by the Underwriters Laboratories (USA), which classifies plastics according to how they burn in various orientations and part thicknesses from the lowest flame-retardant to most flame-retardant in six different classifications. In a preferred embodiment, the adapter body 102 has a UL 94 rating of V-1 (burning stops within 30 seconds on a vertical part allowing for drops of plastic that are not inflamed), V-0 (burning stops within 10 seconds on a vertical part allowing for drops of plastic that are not inflamed), 5VB (burning stops within 60 seconds; test specimens may have a burn-through), or, preferably, 5VA (burning stops within 60 seconds; test specimens may not have a burn-through; this is the highest, i.e., most flame retardant, UL 94 rating). Given the close proximity of the adapter body 102 to the electrical circuit wires, the adapter body 102 should preferably be of a material that is substantially flame retardant to prevent and/or slow the spread of fire. In preferred embodiments, the adapter body 102 is of a polysiloxane (also commonly referred to as silicone rubber) material, neoprene rubber, nitrile rubber (also known as nitrile butadiene rubber), ethylene propylene diene monomer (EPDM) rubber, fluorosilicone rubber (FVMQ), or a substantially non-conductive or flame retardant polypropylene composition that is preferably sufficiently flexible to be manually fitted within the adapter channel 110 on and around the inner edge of the extension ring. In alternate embodiments where the adapter body 102 is not wholly of a flame-retardant material, the adapter body 102 may comprise, in whole or in part, flame retardant plastic additives to achieve a comparable function. Exemplary flame retardant plastic additives include, by way of example and without limitation, mineral compounds such as aluminum and magnesium hydroxides (which break down endothermically when subjected to high heat); halogenated flame retardants such as brominated flame retardants (BRFs) which are low in cost and work on a wide variety of polymers (though some applicable governmental and industry regulatory standards have banned the use of halogenated retardants); and phosphorus flame retardants, including phosphate-ester compounds, which are non-halogenated compounds that act on the solid state of combustible materials. The foregoing is not intended to be construed as an exhaustive list of acceptable or comparable material compositions for the adapter body 102.

In one embodiment of the present invention, the adapter body 102 is monolithic, i.e., formed from a single material to beneficially avoid or prevent failure and/or fracture of members disposed on the adapter body 102. In an embodiment, the adapter body is provided with smooth inner walls that are free of sharp edges that would/could cut through the insulation on wires contained within the electrical box. As is known in the art, when wire insulation is breached, short circuits can occur that blow fuses, damage electrical components, cause electrical shocking hazards to humans, cause sparks that can start fires, and more. Thus, the present invention is advantageous, as it connects two electrical boxes via a smooth element, free of sharp points that could breach the insulation of wires.

Figure 6:
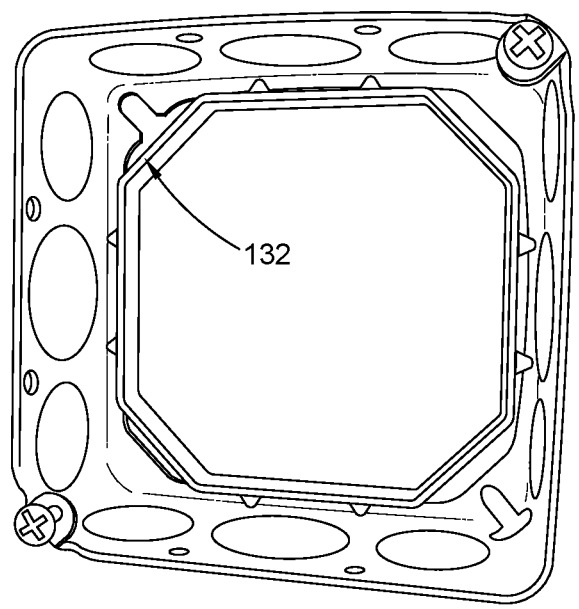
FIG. 6 is a perspective front view of an electrical box extension ring and an exemplary edge adapter for electrical box extension rings, in accordance with an exemplary embodiment of the present invention.
Figure 7:
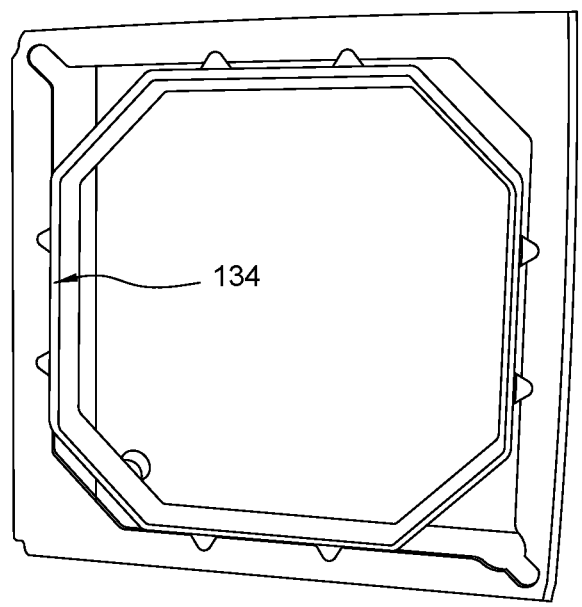
FIG. 7 is a perspective rear view of an electrical box extension ring and an exemplary edge adapter for electrical box extension rings, in accordance with an exemplary embodiment of the present invention.
Figure 8:
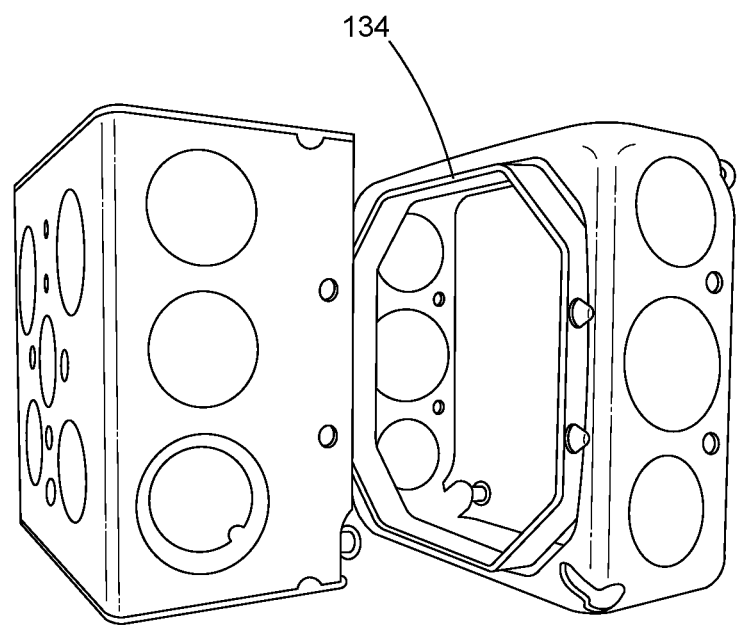
FIG. 8 is a perspective side view of an electrical box and extension ring with an exemplary edge adapter for electrical box extension rings disposed thereon, in accordance with the present invention.
Figure 9:
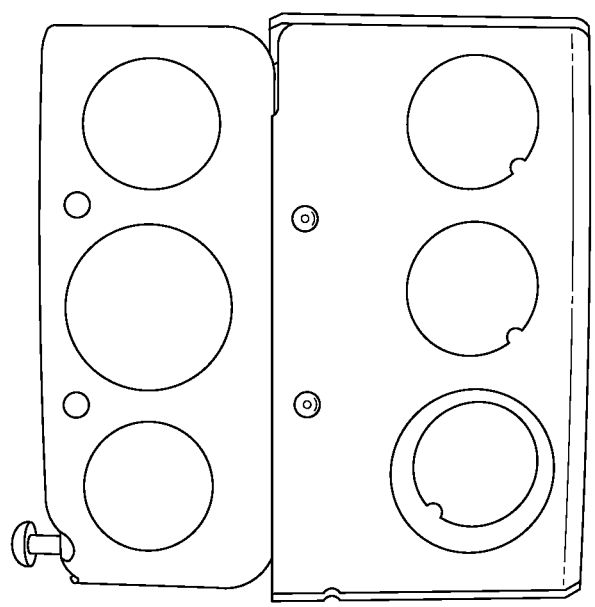
FIG. 9 is an elevational side view of an electrical box and extension ring.

As best seen in FIG. 6, FIG. 12, and FIG. 14, the front edge 132 is proximally disposed to face outwardly away from the wall structure. As best seen in FIGS. 7-8, FIG. 11, and FIG. 13, the rear edge 134 opposes the front edge 132 and faces toward the wall structure. The outer wall surface 106 of the sidewall 104 faces outwardly away from the adapter channel 110. The inner wall surface 108 of the sidewall 104 faces inwardly toward the adapter channel 110. In order to completely cover the exposed sharp inner edge(s) of the extension ring and shield circuit wires and individuals from harm or damage by the inner edge, the outer wall surface 106 and the inner wall surface 108 are substantially planar, wherein "substantially planar" is defined herein as having a generally flat surface with no sharp edges that would ordinarily cut into or short circuit the circuit wires, and separate the front and rear edges 132, 134. The adapter channel 110 must be sufficiently wide enough to allow the electrical circuit wires to comfortably fit through the adapter channel 110 and rest within the adapter channel 110 without interfering with the function of the wires, i.e., the adapter channel 110 cannot be so narrow that it squeezes, compresses, or presses down on the electrical circuit wires as this may damage the wires, cause them to short circuit, or otherwise interfere with the electrical circuit running throughout.

In a preferred embodiment, the sidewall 104 further comprises a sidewall thickness 300 separating the outer and inner wall surfaces 106, 108, wherein the sidewall thickness 300 is less than approximately 12 mm. In an exemplary embodiment, the sidewall thickness 300 is approximately 2 mm though the sidewall thickness 300 may be as high as 12 mm in alternate embodiments. The sidewall thickness 300 is preferably not greater than 12 mm as a greater thickness would substantially reduce the area and volume of the adapter channel 110, thereby severely restricting the amount of free space left within the adapter channel 110 for the electrical circuit wires to run through and rest within. As explained previously herein, the adapter channel 110 must be sufficiently wide enough to allow the electrical circuit wires to comfortably fit through the adapter channel 110 and rest within the adapter channel 110 without interfering with the function of the wires, i.e., the adapter channel 110 cannot be so narrow that it squeezes, compresses, or presses down on the electrical circuit wires as this may damage the wires, cause them to short circuit, or otherwise interfere with the electrical circuit running throughout. However, the sidewall thickness 300 must be sufficiently thick to adequately perform the function the edge adapter 100 is designed and operably configured to perform, i.e., protecting or shielding the electrical circuit wires from being cut, slashed, or otherwise damaged by the exposed sharp inner edge of the extension ring and to protect individuals coming into proximal or direct physical contact with the electrical box and extension ring from the same. As such, an exemplary sidewall thickness 300 ranges between approximately 2 mm and 12 mm. For substantially the same reasons, i.e., protection of circuit wires and individuals, the sidewall thickness 300 uniformly spans around a circumference of the sidewall 104 in a preferred embodiment of the present invention. A uniform thickness spanning around the circumference of the sidewall 104 ensures that a uniform level of protection is provided regardless of which portion of the sidewall 104 is involved or implicated.

Figure 2:
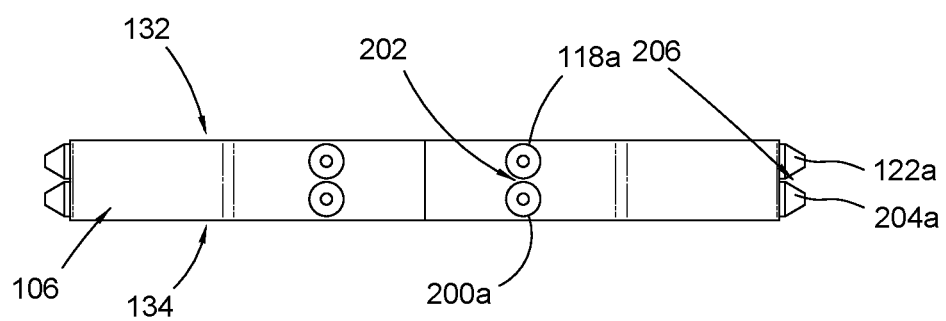
FIG. 2 is an elevational left side view (which would look the same from the right, front, and rear views) of the edge adapter for electrical box extension rings of FIG. 1, in accordance with one exemplary embodiment of the present invention.

Referring now to FIGS. 1-3, the adapter body 102 further comprises a first plurality of retention flanges 112a-b radially projecting from, and disposed in a tightly-spaced configuration on, the outer wall surface 106 on a first side 114 of the adapter body 102, the first plurality of retention flanges 112a-b defining a first retention slot 116; and a second plurality of retention flanges 118a, 200a radially projecting from, and disposed in a tightly-spaced configuration on, the outer wall surface 106 on a second side 120 of the adapter body 102 opposing the first side 114 of the adapter body 102, the second plurality of retention flanges 118a, 200a defining a second retention slot 202, the first and second retention slots 116, 202 having a portion of an inner wall 400 with an outer edge 402 of an electrical box extension ring 404 disposed respectively therein and the first and second plurality of retention flanges 112a-b, 118a, 200a selectively removably coupled to the electrical box extension ring 404 in a retained configuration. The first and second plurality of retention flanges 112a-b, 118a, 200a are operably configured to selectively removably couple the adapter body 102 to the electrical box extension ring 404 and to do so in a retained configuration that substantially prevents the adapter body 102 from becoming inadvertently or unintentionally decoupled from the electrical box extension ring 404 during use. The first and second retention slots 116, 202 are proportionately sized and shaped to receive the outer edge 402 of the electrical box extension ring 404 and retain the inner wall 400 of the electrical box extension ring 404 therein. Accordingly, the first and second retention slots 116, 202 are preferably shaped and sized to be slightly less than the inner wall 400 with of the electrical box extension ring 404 so as to be able to receive and retain the inner wall 400 of the electrical box extension ring 404 in the first and second retention slots 116, 202. In a preferred embodiment, the size and dimensions of the first and second retention slots 116, 202 deviate approximately between 5% and 10% from the size and dimensions of the inner wall 400 so as to cause compression between the first and second plurality of retention flanges 112a-b, 118a, 200a and the inner wall 400 sufficient to securely and snugly retain the inner wall 400 within the first and second retention slots 116, 202 and prevent the edge adapter 100 from uncoupling from the electrical box extension ring 404. As seen in the figures, FIGS. 2-3 may look the same from each side of adapter body 102, i.e., FIG. 2 may depict either a top or bottom view of the edge adapter 100 and FIG. 3 may depict either a front or rear view of the edge adapter 100.

In a preferred embodiment, the tightly-spaced configuration generates a length defining the first and second retention slots 116, 202 that is less than approximately 12 mm. Because the first and second retention slots 116, 202 are operably configured to receive and retain the inner wall 400 of the electrical box extension ring 404, the length defining the first and second retention slots 116, 202 must be long enough to receive a length of the inner wall 400 sufficient to securely retain the inner wall 400 within the first and second retention slots 116, 202 and prevent inadvertent decoupling of the edge adapter 100 from the extension ring 404. However, if the length defining the first and second retention slots 116, 202 is excessively large, the inner wall 400 will be loosely, and not securely or snugly, positioned within the first and second retention slots 116, 202 such that no tightly-spaced configuration is created. This would prevent the edge adapter 100 from being securely selectively removably coupled to the extension ring 404. In a preferred embodiment, therefore, the length defining the first and second retention slots 116, 202 is no longer than approximately 12 mm.

In accordance with a further feature of the present invention, the first and second plurality of retention flanges 112a-b, 118a, 200a each further comprise a distal terminal end 136, the distal terminal end 136 offset an offset length 304 (depicted in FIG. 3) from the outer wall surface 106 less than approximately 12 mm, but is preferably no greater than 3 mm to ensure a proper fit. The offset length 304 functions as a retaining mechanism to retain the inner wall 400 of the extension ring 404 in the first and second retention slots 116, 202. Specifically, the first and second plurality of retention flanges 112a0b, 118a, 200a, in conjunction with the offset length 304, serve as physical barriers proximally disposed on either side of the inner wall 400 to prevent the inner wall 400 from escaping from or sliding out of the first and second retention slots 116, 202. An excessively large offset length 304, however, will cause the edge adapter 100 to be unable to be manually positioned on the inner edge of the extension ring 404 or to fit within the extension ring 404. In a preferred embodiment, therefore, the offset length 304 is less than approximately 12 mm.

In one embodiment, the edge adapter 100 further comprises a third plurality of retention flanges 122a, 204a radially projecting from, and disposed in a tightly-spaced configuration on, the outer wall surface 106 on a third side 124 of the adapter body 102, the third plurality of retention flanges 122a, 204a defining a third retention slot 206; and a fourth plurality of retention flanges 126a-b radially projecting from, and disposed in a tightly-spaced configuration on, the outer wall surface 106 on a fourth side 128 of the adapter body 102 opposing the third side 124 of the adapter body 102, the fourth plurality of retention flanges 126a-b defining a fourth retention slot 130, the third and fourth retention slots 206, 130 having a portion of the inner wall 400 with the outer edge 402 of the electrical box extension ring 404 disposed respectively therein and the third and fourth plurality of retention flanges 122a, 204a, 126a-b selectively removably coupled to the electrical box extension ring 404 in the retained configuration. The third and fourth plurality of retention flanges 122a, 204a, 126a-b provide additional structural support, serving as further retaining mechanisms, to selectively removably couple the edge adapter 100 to the extension ring 404 by receiving and retaining the inner wall 400 of the extension ring 404 within the third and fourth retention slots 206, 130.

As best depicted in FIG. 3, the adapter body 102 further defines a median axis 302 spanning through a geometric center of the adapter body 102, the adapter body 102 having the first, second, third, and fourth plurality of retention flanges 112a-b, 118a, 200a, 122a, 204a, 126a-b symmetrically disposed about the median axis 302. The symmetrical disposition about the median axis 302 provides for an even distribution of the retaining mechanism by which the edge adapter 100 is selectively removably coupled to the extension ring 404 and the structural support related thereto. In alternate embodiments, such as that depicted in FIG. 15, the adapter body 102 may comprise (in addition to a first, second, third, and fourth plurality of retention flanges 112a-b, 118a, 200a, 122a, 204a, 126a-b) a fifth, sixth, seventh, eighth, or greater plurality of retention flanges, all of which are symmetrically disposed about the median axis 302, with all pluralities of retention flanges disposed in an interposing configuration with respect to one another.

In embodiments with first, second, third, and fourth plurality of retention flanges 112a-b, 118a, 200a, 122a, 204a, 126a-b, the third and fourth plurality of retention flanges 122a, 204a, 126a-b are disposed in an interposing configuration with respect to the first and second plurality of retention flanges 112a-b, 118a, 200a to further facilitate the even distribution of structural and retention support spanning along the length of the sidewall 104 of the adapter body 102 and the inner wall 400 of the electrical box extension ring 404.

The present invention further provides an improvement, in combination with an electrical box extension ring 404 having a sidewall 406 enclosing a extension ring channel 408, an inner wall 400 radially extending from the sidewall 406 inward to the extension ring channel 408 and having an outer edge 402, the improvement comprising the edge adapter 100 for electrical box extension rings having the adapter body 102 with the first plurality of retention flanges 112a-b radially projecting from, and disposed in a tightly-spaced configuration on, the outer wall surface 106 on the first side 114 of the adapter body 102, the first plurality of retention flanges 112a-b defining a first retention slot 116; and the second plurality of retention flanges 118a, 200a radially projecting from, and disposed in a tightly-spaced configuration on, the outer wall surface 106 on the second side 120 of the adapter body 102 opposing the first side 114 of the adapter body 102, the second plurality of retention flanges 118a, 200a defining the second retention slot 202, the first and second retention slots 116, 202 having a portion of the inner wall 400 with the outer edge 402 of the electrical box extension ring 404 disposed respectively therein and the first and second plurality of retention flanges 112a-b, 118a, 200a selectively removably coupled to the electrical box extension ring 404 in a retained configuration. In alternate embodiments, the improvement may further comprise the third and fourth plurality of retention flanges 122a, 204a, 126a-b as set forth herein.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above-described features.

The claims appended hereto are meant to cover all modifications and changes within the scope and spirit of the present invention.

What is claimed is:

1. An edge adapter for electrical box extension rings comprising:
    a flexible adapter body enclosing and defining an adapter channel, the flexible adapter body having a continuous sidewall defining at least four sides, each side having an inner wall surface facing the adapter channel and free of sharp edges sufficient to cut through wire insulation and an outer wall surface opposite to the inner wall surface;
    a first pair of retention flanges adjacent one another and disposed on and radially projecting from the outer wall surface on a first side of the adapter body;
    a second pair of retention flanges adjacent one another and disposed on and radially projecting from the outer wall surface on the first side of the adapter body, the first pair of retention flanges and the second pair of retention flanges together defining a first retention slot shaped and dimensioned to receive a first inner wall of an electrical box extension ring;
    a third pair of retention flanges adjacent one another and disposed on and radially projecting from the outer wall surface on the second side of the adapter body opposite the first side; and
    a fourth pair of retention flanges adjacent one another and disposed on and radially projecting from the outer wall surface on the second side of the adapter body, the third pair of retention flanges and the fourth pair of retention flanges together defining a second retention slot shaped and dimensioned to receive a second inner wall of the electrical box extension ring.

2. The edge adapter for electrical box extension rings according to claim 1, further comprising:
    a fifth pair of retention flanges adjacent one another and disposed on and radially projecting from the outer wall surface on a third side of the adapter body; and
    a sixth pair of retention flanges adjacent one another and disposed on and radially projecting from the outer wall surface on the third side of the adapter body, the fifth pair of retention flanges and the sixth pair of retention flanges together defining a third retention slot shaped and dimensioned to receive a third inner wall of an electrical box extension ring.

3. The edge adapter for electrical box extension rings according to claim 2, wherein:
    the fifth and sixth pair of retention flanges are interposed along the sidewall between the first and second pair of retention flanges on the one the hand and the third and fourth pair of retention flanges on the other hand.

4. The edge adapter for electrical box extension rings according to claim 1, wherein:
a sidewall thickness separating the outer wall surface from the inner wall surface is between 2 mm and 12 mm.

5. The edge adapter for electrical box extension rings according to claim 4, wherein:
the sidewall thickness is uniform throughout the sidewall.

6. The edge adapter for electrical box extension rings according to claim 1, wherein:
a sidewall thickness separating the outer wall surface from the inner wall surface is less than approximately 5 mm.

7. The edge adapter for electrical box extension rings according to claim 1, wherein:
the flexible adapter body is of a flame-retardant material.

8. The edge adapter for electrical box extension rings according to claim 1, wherein:
a distance between the first pair of retention flanges and the second pair of retention flanges is approximately 12 mm.

9. The edge adapter for electrical box extension rings according to claim 1, wherein:
the flexible adapter body defines a median axis spanning through a geometric center of the adapter body, the first pair of retention flanges and the second pair of retention flanges symmetrically disposed on opposite sides of the median axis.

10. The edge adapter for electrical box extension rings according to claim 1, wherein:
a distance between the first side of the adapter body and the second side of the adapter body is less than a distance between the first inner wall and the second inner wall of the electrical box extension ring; and
a distance between a distal terminal end of the first pair of retention flanges and a distal terminal end of the third pair of retention flanges is greater than the distance between the first inner wall and the second inner wall of the electrical box extension ring.

11. The edge adapter for electrical box extension rings according to claim 1, wherein the first pair of retention flanges and the second pair of retention flanges each further comprise:
a distal terminal end, the distal terminal end offset an offset length, measured from the outer wall surface to the distal terminal end, that is less than approximately 12 mm.

12. An electrical box extender assembly comprising:
an electrical box extension ring having:
a sidewall; and
an inner wall perpendicular to the sidewall and radially extending inwardly therefrom; and
an edge adapter for electrical box extension rings having:
a flexible adapter body enclosing and defining an adapter channel, the flexible adapter body having a continuous sidewall defining at least four sides, each side having an inner wall surface facing the adapter channel and free of sharp edges sufficient to cut through wire insulation and an outer wall surface opposite to the inner wall surface;
a first pair of retention flanges adjacent one another and disposed on and radially projecting from the outer wall surface on a first side of the adapter body;
a second pair of retention flanges adjacent one another and disposed on and radially projecting from the outer wall surface on the first side of the adapter body, the first pair of retention flanges and the second pair of retention flanges together defining a first retention slot shaped and dimensioned to receive a first portion of the inner wall of the electrical box extension ring;
a third pair of retention flanges adjacent one another and disposed on and radially projecting from the outer wall surface on the second side of the adapter body opposite the first side; and
a fourth pair of retention flanges adjacent one another and disposed on and radially projecting from the outer wall surface on the second side of the adapter body, the third pair of retention flanges and the fourth pair of retention flanges together defining a second retention slot shaped and dimensioned to receive a second portion of the inner wall of the electrical box extension ring opposite the first portion of the inner wall of the electrical box extension ring.

13. The electrical box extender assembly according to claim 12, further comprising:
a fifth pair of retention flanges adjacent one another and disposed on and radially projecting from the outer wall surface on a third side of the adapter body; and
a sixth pair of retention flanges adjacent one another and disposed on and radially projecting from the outer wall surface on the third side of the adapter body, the fifth pair of retention flanges and the sixth pair of retention flanges together defining a third retention slot shaped and dimensioned to receive a third portion of the inner wall of the electrical box extension ring located between the first and second portions of the inner wall of the electrical box extension ring.

14. The electrical box extender assembly according to claim 13, wherein:
the fifth and sixth pair of retention flanges are interposed along the sidewall between the first and second pair of retention flanges on the one the hand and the third and fourth pair of retention flanges on the other hand.

15. The electrical box extender assembly according to claim 14, wherein:
a sidewall thickness separating the outer wall surface from the inner wall surface is between 2 mm and 12 mm.

16. The electrical box extender assembly according to claim 15, wherein:
the sidewall thickness is uniform throughout the sidewall.

17. The electrical box extender assembly according to claim 12, wherein:
a sidewall thickness separating the outer wall surface from the inner wall surface is less than approximately 5 mm.

18. The electrical box extender assembly according to claim 12, wherein:
a distance between the first pair of retention flanges and the second pair of retention flanges is approximately 12 mm.

19. The electrical box extender assembly according to claim 12, wherein:
the flexible adapter body defines a median axis spanning through a geometric center of the adapter body, the first pair of retention flanges and the second pair of retention flanges symmetrically disposed on opposite sides of the median axis.

20. The electrical box extender assembly according to claim 12, wherein:
a distance between the first side of the adapter body and the second side of the adapter body is less than a distance between the first portion of the inner wall and the second portion of the inner wall of the electrical box extension ring; and a distance between a distal terminal end of the first pair of retention flanges and a distal terminal end of the third pair of retention flanges is greater than the distance between the first portion of the inner wall and the second portion of the inner wall of the electrical box extension ring.

* * * * *